(12) United States Patent
Shelley et al.

(10) Patent No.: US 6,217,701 B1
(45) Date of Patent: Apr. 17, 2001

(54) DESICCANT COMPOSITION

(75) Inventors: Richard M. Shelley; Matthew Lee Rix, both of Belen, NM (US)

(73) Assignee: United Catalysts Inc., Belen, NM (US)

( * ) Notice: Subject to any disclaimer, the term of this patent is extended or adjusted under 35 U.S.C. 154(b) by 0 days.

(21) Appl. No.: 09/348,397

(22) Filed: Jul. 7, 1999

Related U.S. Application Data

(63) Continuation-in-part of application No. 08/715,067, filed on Sep. 19, 1996, now Pat. No. 5,743,942, and a division of application No. 08/748,362, filed on Nov. 13, 1996, now Pat. No. 5,935,304.

(51) Int. Cl.[7] .................................................. B32B 31/20
(52) U.S. Cl. ......................................................... 156/308.4
(58) Field of Search ........................... 156/308.4; 96/118; 252/194

(56) References Cited

U.S. PATENT DOCUMENTS

| | | |
|---|---|---|
| 1,383,247 | 6/1921 | Smith et al. . |
| 1,798,862 | 3/1931 | Baker . |
| 2,027,093 | 1/1936 | Downs . |
| 3,334,468 | 8/1967 | Wilcox . |
| 3,390,511 | 7/1968 | Norton . |
| 3,779,936 | 12/1973 | Pearce et al. . |
| 3,885,926 | 5/1975 | Manning et al. . |
| 3,923,944 | 12/1975 | Clark . |
| 4,464,261 | 8/1984 | Cullen et al. . |
| 4,749,392 | 6/1988 | Aoki et al. . |
| 4,826,516 | 5/1989 | Matsuoka et al. . |
| 5,035,731 | 7/1991 | Spruill et al. . |
| 5,114,003 | 5/1992 | Jackisch et al. . |
| 5,308,665 | 5/1994 | Sadek et al. . |
| 5,743,942 | 4/1998 | Shelley . |

FOREIGN PATENT DOCUMENTS

| | | |
|---|---|---|
| 0 260 986 A2 | 3/1988 | (EP) . |
| 0793 992 A2 | 10/1997 | (EP) . |
| 5 1001 388 | 1/1976 | (JP) . |
| 61-103523 | 5/1986 | (JP) . |
| 1310 716 | 6/1988 | (JP) . |
| 2229 522 | 10/1988 | (JP) . |
| 5-68842 | 9/1991 | (JP) . |
| 6-210123 | 8/1994 | (JP) . |
| 700 187 | 12/1979 | (SU) . |

OTHER PUBLICATIONS

Kirk–Othmer, "Drying Agents", Encyclopedia of Chemical Technology, vol. 7, pp. 378–398.

*Primary Examiner*—Michael W. Ball
*Assistant Examiner*—John T. Haran
(74) *Attorney, Agent, or Firm*—Scott R. Cox

(57) ABSTRACT

Disclosed is a new desiccant composition containing calcium chloride and a modified starch, preferably a modified corn starch. The composition contains from about 5 to about 95 percent calcium chloride and from about 5 to about 95 percent starch.

10 Claims, 1 Drawing Sheet

DESICCANT COMPOSITION

CROSS REFERENCE TO RELATED APPLICATIONS

This application is a continuation-in-part of Ser. No. 08/715,067, filed on Sep. 19, 1996, which issued as U.S. Pat. No. 5,743,942 on Apr. 28, 1998, and a divisional application of Ser. No. 08/748,362, filed Nov. 13, 1996, which issued as U.S. Pat. No. 5,935,304 on Aug. 10, 1999.

BACKGROUND OF INVENTION

1. Field of Invention

This invention relates to desiccant containers. More specifically, this invention relates to a composition of material for use in a desiccant container comprising a combination of calcium chloride and starch.

2. Prior Art

Desiccant containers which absorb water vapor, water, liquids and the like are well known in the art. Generally, these containers are comprised of a water or water vapor permeable packaging material formed from fibrous or film products securely sealed together at the edges of the packaging. The packaging material encapsulates a desiccant material, such as silica gel. The volume of water or water vapor absorbed by the desiccant container is generally determined by the absorbent capacity of the desiccant material contained within the container.

One type of desiccant container absorbs both water vapor and liquid water by permitting both to pass through the packaging material to be absorbed by the desiccant material. In some circumstances, the packaging material for this type of product dissolves to permit the desiccant material contained within the desiccant container to have direct contact with the liquid.

Another type of desiccant container absorbs water vapor but not liquid water. The packaging material for this type of desiccant container is designed to prevent water absorbed within the desiccant container as water vapor from being released from the desiccant container in the form of liquid water.

There are many common products that are utilized as desiccating agents. Among the most common used include silica gel, calcium sulfate, calcium fluoride, activated charcoal, molecular sieves, lithium chloride, calcium chloride and other such products. A common list of these drying agents is contained, for example, in Kirk-Othmer, *Encyclopedia of Chemical Technology*, Volume 7, pages 378–398. Common desiccating agents for use in conventional desiccant containers are also disclosed in U.S. Pat. No. 5,114,003, which discloses the use of a montmorillonite clay, silica gel, molecular sieve, calcium oxide, calcium sulfate and calcium chloride. The use of silica gel, alumino silicate, alumina, activated charcoal and molecular sieves as desiccating agents are disclosed in U.S. Pat. No. 4,464,261.

Commercial grade calcium chloride is a widely used desiccant due to its low cost and high degree of hygroscopicity. Calcium chloride compacted in the form of particles or beads is used as a drying agent, for example, in U.S. Pat. No. 3,923,944.

Mixtures and combinations of other materials have been combined with calcium chloride to form desiccating products. For example, polyethylene glycol was mixed with calcium chloride to form a desiccant product in U.S. Pat. No. 3,779,936. In addition, U.S. Pat. No. 3,334,468 discloses the use of sodium chloride or sodium carbonate with calcium chloride. Further, the combination of calcium chloride with magnesium, lithium or ammonium salts is disclosed, for example, in U.S. Pat. No. 3,885,926. The use of calcium chloride with a metal, for example, iron fillings, is disclosed in U.S. Pat. No. 1,798,862. Further, the use of activated carbon with calcium chloride as a desiccant product is disclosed in U.S. Pat. No. 2,027,093.

U.S. Pat. No. 3,390,511 discloses the use of calcium chloride placed on a carrier material for use as a gas dryer desiccant. The preferred material that is utilized as the carrier for the calcium chloride is sodium chloride. See also, U.S. Pat. No. 3,334,468. The desiccant product in U.S. Pat. No. 3,390,511 preferably comprised about 90 to 97 percent sodium chloride as the carrier and about 10 to about 3 percent calcium chloride. In addition, sodium dichromate and trisodium phosphate in minor amounts may be included in the product. While the preferred carrier for the calcium chloride was sodium chloride, other disclosed carriers included sugar, potassium chloride, potassium nitrate, sodium nitrate and starch. See column 3, line 33. The percentage of calcium chloride used in this product was 10 percent or less, because the major component of the product was the carrier.

One of the problems in the utilization of calcium chloride as a desiccating agent is that when the water is absorbed, it forms a liquid mixture on the surface of the calcium chloride. This is discussed in U.S. Pat. No. 3,334,468. With conventional desiccant products this liquid may leak which can cause problems, for example, if the desiccant product is used in storage containers.

While these references disclose the use of calcium chloride as a desiccant either alone or combined with a number of different compositions, there is still the need for improved desiccant products utilizing calcium chloride.

Therefore it is an object of this invention to disclose a desiccant composition containing calcium chloride as its major component.

It is a still further object of this invention to disclose a desiccant composition containing calcium chloride mixed with a significant amount of starch to form the desiccant composition.

It is a still further object of the invention to disclose a desiccant composition contained within a packaging material, wherein the desiccant composition is a combination of calcium chloride and starch, preferably a modified starch.

It is a still further object of this invention to disclose a desiccant composition containing calcium chloride where water absorbed by the calcium chloride does not leak from the desiccant container.

It is a still further object of this invention to disclose a desiccant composition contained within a packaging material wherein the desiccant composition prevents leakage of water from within the package by use of a starch, preferably a modified starch.

These and other objects and features of the present invention will become apparent to those skilled in the art from a consideration of the following detailed description, drawings and claims. The description, along with the accompanying drawings, provides a selected example of the construction of the product and process to illustrate the invention.

SUMMARY OF INVENTION

In accordance with the present invention there is provided a desiccant composition comprising calcium chloride and starch, wherein the calcium chloride comprises at least about 5 to about 95 percent of the composition by weight and the starch from about 5 to about 95 percent of composition. In the preferred embodiment calcium chloride comprises from about 20 to about 95 percent of the composition by weight while the starch comprises from about 5 to about 80 percent of the composition by weight. While the starch used may be unmodified, in a preferred embodiment, it is a modified starch, preferably a modified corn starch.

BRIEF DESCRIPTION OF THE DRAWINGS

This invention will now be described with reference to the accompanying drawings in which.

DETAILED DESCRIPTION OF THE PREFERRED EMBODIMENT

Figure 1:
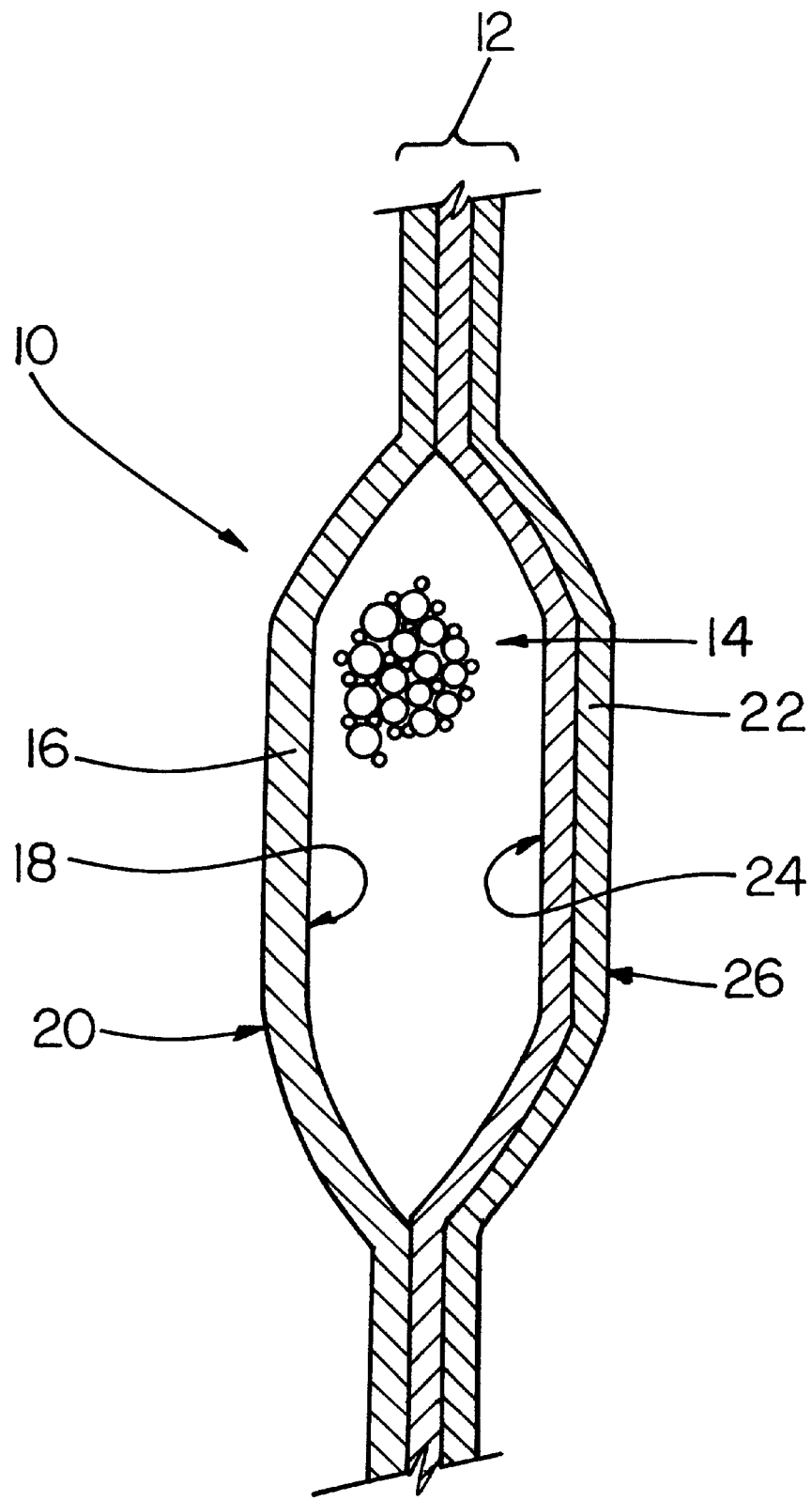
FIG. 1 is a perspective view of the desiccant container.

Although the invention is adaptable to a wide variety of uses, it is shown in the drawings for the purpose of illustration as embodied in a desiccant container (10) for absorbing and immobilizing a liquid comprised of a desiccant packaging material (12) encapsulating a liquid absorbing and immobilizing desiccant material (14). See FIG. 1.

The desiccant packaging material (12) may comprise any conventional packaging material. Preferably, it comprises a laminated film layer (16) with an inner (18) and outer (20) surface preferably formed from an uncoated microporous or nonwoven film layer sealed to an uncoated, water vapor permeable laminate film (22) with an inner (24) and outer (26) surface. The inner surface of the layers are sealed at the edges as shown in FIG. 1.

Conventional microporous or nonwoven films used for the manufacture of a laminated packaging material have been formed into a composite film bonded to another layer of material. Conventionally, the bonding of the two layers is accomplished by the use of an adhesive which coats one or both of the inside surfaces of the layers. It has been surprisingly discovered that strong, laminated desiccant packaging materials can be produced from uncoated microporous or nonwoven films.

The uncoated microporous or nonwoven film (16) comprises a film having a plurality of fine openings, which film is gas permeable, but water impermeable when there is no difference between the air pressure outside of the film and inside of the film. The size of the openings is preferably in the range of about 0.01 to 50 microns. The uncoated microporous or nonwoven film may constitute a single film layer or may comprise a laminate of separate microporous film layers. Preferably the film is a single layer microporous film formed from a polyolefinic material, such as polyethylene, polypropylene, poly(fluorinated ethylene), ethylene vinyl acetate, ethylene acrylic ester and the like. The uncoated microporous or nonwoven film may be prepared by any conventional film forming process including cold orientation of the film, orientation of different substance-containing films, extraction of different substances from different substance-containing films, extraction of different substance-containing film followed by orientation of the treated film, cross-dispersing of a bundle of fibers followed by heat-pressing the resulting film and any other conventional procedures utilized for the formation of a microporous film. Many such microporous films are commercially available and are sold, for example, under the name Celgard® (Hoechst Celanese Corporation), GORE-TEX® (Gore & Co. Gmbh) and Tyvek® (E.I. DuPont). The preferred microporous film has a Gurley-type air permeability of about 0.01 to 10,000 sec./100 millimeters, preferably 1 to 1,000 second/100 millimeters and most preferably less than about 400 seconds/100 millimeters. Preferably, the microporous film is a polyethylene or polypropylene-based microporous film and most preferably a polyethylene spunbonded paper such as Tyvek® 1059B or 1037B manufactured by E.I. DuPont, or a polypropylene based film, such as GDT II manufactured by San Ai, Ltd. of Osaka, Japan.

The second layer of the desiccant packaging material is preferably formed from the uncoated laminate film (22). The laminate film can be formed of conventional polymeric materials. The critical aspect of the composition of the laminate film is that its inner surface (24), which is bonded to the inner surface (18) of the uncoated microporous or nonwoven film layer at the edges of the packaging material, must be comprised of materials which are compatible with the composition of the inner surface of the microporous or nonwoven film layer. Materials that can be used to form this laminate film include conventional polyolefinic materials such as polyolefinic polypropylene, polyolefinic polyethylene, polyesters and the like. Preferably, the uncoated laminate film has a lower moisture vapor transmission rate than the microporous or nonwoven film. Also preferably the softening temperature of the uncoated laminate film is lower than or equal to the softening temperature of the inner surface of the uncoated microporous film. Preferably the laminate film is comprised of a laminated film comprising a high melting or softening point material, such as polyester, located on one side laminated to a lower melting point material, such as polypropylene on the opposite side. Examples of acceptable laminate film include, for example, RPP91-1964 or RPP-31-1007a manufactured by RollPrint.

The outer surface (26) of the laminate film are preferably formed from materials which are incompatible with the microporous layer, such as materials having a higher melting or softening point than that of the inner surface of the microporous film, such as polyester material. In contrast, the inner surface of the laminate film (24) must be formed from a material which is compatible with the inner surface (18) of the microporous film. By having the two inner surfaces formed from compatible materials, a strong bond is formed between those layers when they are heat sealed together.

"Compatible" means that the materials mix on a molecular scale and will crystallize homogeneously. Thus, while such layers may not have precisely the same softening point, they should have softening points which are consistent, so that the materials will mix on a molecular level. Compatible bonds generally have a bond strength of at least about 5 lb./in. or more. For example, the compatible materials may include high density, low density, or linear low-density polyethylenes as well as nonoriented, bi-axially oriented or laminated polypropylenes. In contrast, the outer surface of at least the laminate film should be manufactured from incompatible materials such as polyester or nylon or a polyethylene or polypropylene material with a higher softening point than the inner surface of the laminate film material.

In addition, it is also critical that the inner surface of both the laminate film and the microporous or nonwoven film be uncoated with an adhesive. Coated film, when sealed to other coated or uncoated films, frequently form poor quality, weak seals. In addition, the sealing machines used for sealing coated films are also more expensive and more difficult to operate, resulting in greater expense for the manufacture of sealing coated films. Further, uncoated films are generally less expensive than coated films, sometimes by as much as 50 percent.

Suitable materials for use as the desiccant material to be incorporated into the desiccant package include conventional desiccating material such as silica gel, clays, calcium chloride, alkali metal carboxylate salts of starch—polyacrylonitrile, sodium polyacrylate and other desiccating products that absorb, gel or thicken upon contact with water or water vapor. However, it has been surprisingly discovered that a preferred desiccant material can be produced from a mixture of calcium chloride and starch, preferably a modified starch, and most preferably a modified corn starch, such as MIRA-SPERSE® 623, 626 and 629 produced by A.E.

Staley Manufacturing Company. The composition of this desiccant material is preferably about 5 to about 95 percent calcium chloride mixed with about 95 to about 5 percent starch. Preferably, the calcium chloride comprises about 20 to about 95 percent while the starch comprises about 80 to about 5 percent of the composition. Most preferably the calcium chloride comprises about 50 to about 80 percent while the starch comprises about 50 to about 20 percent of the composition.

The starches that are utilized in this invention can include unmodified starches, oxidized starch, enzyme-converted starches a and modified starches containing functional groups such as hydroxyl, carbonyl, amido and amino groups. The term "starch" therefore as used throughout this specification and claims is intended to include any member of the family of starches, or mixture of two or more starches The preferred starch is a modified starch, such as an oxidized, enzyme-converted starch. The modification to the starch may be chemical, such as by crosslinking or substitution, or physical, such as by granulation.

Ordinary starch, such as pearl starch, is not commonly utilized in its raw state because of its high viscosity and retrogradation, which is a particular problem with unmodified starches. These p problems are reduced substantially with modified starches, such as hydroxyethylated starches. As such, most industries convert their unmodified starches to modified starches, such as oxidized, enzyme converted or hydroxyethylated starch. Alternatively, a further modified starch, in the form of a cationic starch, can be used. However, the cost of such cationic starch is significant in comparison to either unmodified or hydroxyethylated starch. Critical to the choice of starch is its ability to absorb water, preferably cool water, i.e., less than about 40–50° C.

In a preferred embodiment the starch when combined with water must have a viscosity greater than water alone. When measured as Brookfield viscosity, the viscosity should be at least about 1.0 cps. The critical function supplied by the modified starch is the ability to mix with water and thicken or gel water or the calcium chloride/water composition formed during the absorption of water by calcium chloride.

The calcium chloride/corn starch desiccant composition can be used not only with the desiccant container outlined above, but also with any conventional desiccant container utilized for the absorption of water or water vapor.

The process for the formation of the desiccating container comprises a number of steps. The desiccant packaging material is first formed. To form the desiccant packaging material of the instant invention, the uncoated microporous and nonwoven film (16) is first formed or acquired from conventional sources. In a preferred embodiment the microporous film is an uncoated microporous or non-woven film such as Celgard® produced by Hoechst Celanese Corporation, Tyvek® Nos. 1059B and 1073B produced by E.I. DuPont or certain other polypropylene-based nonwoven films such as GDTI, II produced by San Ai of Osaka, Japan. As stated above, the permeability of this microporous film should be in the range of about 1 to about 1,000 Gurley seconds per 100 millimeters and preferably less than about 400 seconds per 100 millimeters.

Following the formation of the uncoated microporous or nonwoven film, the uncoated laminate film (22) is formed. As stated above, this uncoated laminate film can be comprised of different layers of the same or different materials laminated together. However, the critical element of the composition of this material is that the film must be uncoated and the inner surface (24) of the laminate film, which is sealed to an inner surface (18) of the microporous material, must be formed of a material which is "compatible" with the inner surface of the uncoated microporous or nonwoven film. In one preferred embodiment, the laminate film is a laminated film containing a polyester material on the outer surface with a polypropylene material on the inner surface, such as RPP 91-1964 made by RollPrint. Another preferred embodiment is RPP 31-1007A, a polyethylene-based material also manufactured by RollPrint.

Following the formation of the two layers, the edges of the layers are sealed together by a conventional heat sealing procedure. One of the advantages of this product is that the bond formed between the two compatible, uncoated materials has a significantly greater strength than conventional bonds utilizing an adhesive coating. By utilizing the capability of compatible materials to form a strong seal without using an adhesive, the strength of the desiccant packaging material is significantly increased over conventional packaging materials. In addition, these uncoated materials have a lower cost of production and run better through the sealing equipment.

The preferred desiccant material is then placed within the desiccant packaging. By using the preferred desiccant material (14) formed from calcium chloride and starch, preferably a modified starch, lesser quantities of the desiccating material may be necessary than is used in conventional desiccating containers and still achieve the same level of moisture absorbency.

The mixture of the calcium chloride and starch is prepared by placing the two components in a conventional mixing apparatus, such as tumble mixer or the two components can be fed directly into the desiccant packaging from two separate feeds. Other than the physical mixing of the materials, no additional processing is necessary for the calcium chloride/starch composition. This simple mixing of the two materials produces a desiccant composition with great utility.

Following the addition of the desiccant material to the desiccant packaging material, the remaining unsealed edges of the desiccant container are sealed to complete the formation of the desiccant container.

EXAMPLES

Example 1

The water absorbing capability of a desiccant combination comprising corn starch with calcium chloride was tested. 133 grams of a 3 to 1 mixture of calcium chloride to Mirasperse 629 modified waxy corn starch sold by Staley Food Ingredients, Decatur, Ill. was placed in a conventional desiccant bag for a desiccant product, which product is sold by United Desiccants and known as "CONTAINER DRI®". The desiccant bag was placed in environmental chamber of 80 percent relative humidity at 25° C. for about two months. The results of this test are shown in attached Table 1.

Example 2

The same tests were run on a composition of 1 to 4 corn starch to calcium chloride utilizing the same type of Mirasperse 624 modified corn starch as was discussed in Example 1. The water absorption over time is shown in the attached Table 1.

Example 3

The water absorbance of a conventional 500 gram CONTAINER DRI® desiccant product produced by United Desiccants was compared with the products of Examples 1 and 2 using the same procedures as were used in Example 1. The water absorption capability of this product over time is also shown in Table 1.

In addition, the capacity of a 1:4 ratio modified starch/calcium chloride product of Example 2 was compared with the conventional 500 gram CONTAINER DRI® product. The capacity at 40 percent relative humidity, moisture uptake at 40 percent relative humidity, capacity at 80 percent relative humidity and moisture uptake at 80 percent relative humidity after two months are shown in Table 2.

As is clear from these examples, greater water absorption is shown for a composition of corn starch and calcium chloride in comparison with the conventional desiccant material. This water absorption capability is at least as good as conventional desiccant packages conventionally sold. In addition, the desiccating composition of Example 2 was compared with the CONTAINER DRI® product after 265 hours. Because of the capability of the starch to absorb the water and the liquid calcium chloride on the surface of the calcium chloride product, water did not leak from the container even after three months.

TABLE 1

| Time, hr | 1:3 Corn Starch to Calcium Chloride ratio, % CAPACITY | 1:4 Corn Starch to Calcium Chloride ratio, % CAPACITY | Typical Container Dri, % CAPACITY |
|---|---|---|---|
| 5.5 | 8.252063 | 10.16 | 1.8 |
| 22.5 | 31.28282 | 36.4 | 2.5 |
| 24 | 36.53413 | 43.2 | 2.88 |
| 28.5 | 38.4096 | 45.04 | 10.59 |
| 94.5 | 54.83871 | 58.64 | 33 |
| 120 | 60.54014 | 64.4 | 38.06 |
| 150 | 92.04801 | 96.08 | 41.58 |
| 169 | 100.9002 | 104.08 | 46.11 |
| 174 | 108.8522 | 114.32 | 47.43 |
| 198 | 121.9805 | 116.3158 | 48.61 |
| 265 | 150.2626 | 147.0677 | 55 |

TABLE 2

| | CAPACITY AT 40% RH | MOISTURE UPTAKE (g) AT 40% RH | CAPACITY AT 80% RH | MOISTURE UPTAKE (g) AT 80% RH |
|---|---|---|---|---|
| 1:4 RATIO MODIFIED STARCH/CaCl2 IN 5 ¾ × 7" BAG | 111.4 | 151.7 | 339.4 | 462.1 |
| NORMAL 500 g CONTAINER DRI Bag | 29.9 | 149.6 | 66.1 | 330.7 |

What is claimed is:

1. A process for manufacturing a desiccant container comprising (a) preparing a water vapor permeable film product, (b) preparing a desiccant composition wherein the desiccant composition comprises calcium chloride and a modified starch wherein the calcium chloride comprises at least about 5 to 95 percent of the composition by weight and the modified starch comprises from about 5 to about 95 percent of the composition by weight, (c) placing the desiccant composition between layers of the water vapor permeable film product, and (d) sealing edges of the water vapor permeable film product around the desiccant composition to produce the desiccant container.

2. The process of claim 1 wherein the calcium chloride comprises from about 20 to about 95 percent of the desiccant composition by weight and the modified starch comprises from about 5 to about 80 percent of the composition by weight.

3. The process of claim 1 wherein the calcium chloride comprises from about 50 to about 80 percent of the desiccant composition by weight and the modified starch comprises from about 20 to about 50 percent of the composition by weight.

4. The process of claim 1 wherein the modified starch comprises a modified corn starch.

5. The process of claim 1 wherein the modified starch exhibits a Brookfield viscosity of at least about 1 cps.

6. The process of claim 1 wherein the modified starch comprises an oxidized starch.

7. The process of claim 1 wherein the modified starch comprises an enzyme-converted starch.

8. The process of claim 1 wherein the modified starch comprises at least one functional group selected from the group consisting of hydroxyl, carbonyl, amido, and amino groups.

9. The process of claim 1 wherein the modified starch is modified by a process selected from the group consisting of cross linking, substitution and granulation.

10. The process of claim 1 wherein the modified starch is selected from the group consisting of oxidized starches, enzyme-converted starches and hydroxyethylated starches.

* * * * *